United States Patent
Chen et al.

(10) Patent No.: US 11,330,345 B2
(45) Date of Patent: May 10, 2022

(54) VERIFICATION CODE GENERATION METHOD, DATA VERIFICATION METHOD AND ELECTRONIC DEVICE

(71) Applicant: GETAC TECHNOLOGY CORPORATION, Hsinchu County (TW)

(72) Inventors: Yu-Shian Chen, Taipei (TW); Kuo-Yang Tseng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 246 days.

(21) Appl. No.: 16/408,384

(22) Filed: May 9, 2019

(65) Prior Publication Data

US 2020/0359109 A1 Nov. 12, 2020

(51) Int. Cl.
*H04N 21/8358* (2011.01)
*H03M 13/09* (2006.01)

(52) U.S. Cl.
CPC ...... *H04N 21/8358* (2013.01); *H03M 13/096* (2013.01)

(58) Field of Classification Search
CPC .......... H04N 21/8358; H04N 21/6334; H04N 21/64715; H04N 21/2407; H04N 21/25816; H04N 21/845; H04N 21/8456; H04N 21/234; H04N 21/8352; H04N 21/8547; H03M 13/096; H04L 9/3239; H04L 9/3247; H04L 2209/34; H04L 2209/60; H04L 9/3297; G06F 21/64
See application file for complete search history.

(56) References Cited

U.S. PATENT DOCUMENTS

| | | | |
|---|---|---|---|
| 7,581,094 B1 | 8/2009 | Apostolopoulos et al. | |
| 7,624,335 B1 | 11/2009 | Maheshwari et al. | |
| 7,653,712 B1 * | 1/2010 | Dubrovsky | H04L 41/0853 709/223 |
| 2002/0194209 A1 | 12/2002 | Bolosky et al. | |
| 2005/0097361 A1 * | 5/2005 | Apostolopoulos | G06F 21/64 726/4 |
| 2007/0239961 A1 | 10/2007 | Noguchi et al. | |
| 2017/0075938 A1 * | 3/2017 | Black | G06F 21/602 |

FOREIGN PATENT DOCUMENTS

EP 0976221 B1 2/2000

* cited by examiner

*Primary Examiner* — Mushfikh I Alam
*Assistant Examiner* — Adil Ocak

(57) ABSTRACT

A verification code generation method is performed in an electronic device which is for performing encoding to generate a video/audio stream having multiple data segments. The verification code generation method includes the following steps. Each time one of the data segments is generated by the encoding, a first-level checksum associated with the data segment is generated, and the first-level checksum is recorded in an accompanying verification file. At an interval of every N data segments of the data segments, a second-level checksum is generated for W consecutive first-level checksums, and the second-level checksum is recorded in the accompanying verification file, such that a subsequent verification method can quickly verify integrity of a part of data according to the accompanying verification file. Wherein, W is a positive integer greater than or equal to 2, N is a positive integer greater than 0 and smaller or equal to W.

10 Claims, 8 Drawing Sheets

---

Identify, from multiple first-level checksums in the accompanying verification file, a first-level checksum corresponding to the video/audio under verification according to a starting time of the video/audio under verification — S610

Verify whether the video/audio under verification is correct according to the first hash value of the first-level checksum corresponding to the video/audio under verification — S620

VERIFICATION CODE GENERATION METHOD, DATA VERIFICATION METHOD AND ELECTRONIC DEVICE

BACKGROUND OF THE INVENTION

Field of the Invention

The present invention relates to the field of video/audio security and, more particularly, to a verification code generation method, a data verification method and an electronic device.

Description of the Prior Art

With the popularity of video/audio recording devices in the recent years, video/audio security has become essential. In the field of video/audio security, verification codes are a critical technology. In general, a verification code is generated by a complex hash function, and a calculation result of such hash function is thus referred to as a hash value, or referred to as a message digest. Theoretically speaking, hash values generated from different data are different, and hence hash values can be used as verification data for determining whether data has been tampered during a transmission process. In a current approach, an entire footage not at all edited is used to generate a hash value, or hash processing is individually performed on multiple frames divided from a completely stored video file. However, in a situation where a video/audio recording device is currently generating a video/audio stream, the above prior art may fail to dynamically generate the verification codes of a part of the data, in a way that a subsequent verification method may fail to verify the integrity of the part of the data.

SUMMARY OF THE INVENTION

In view of the above, it is an object of the present invention to provide a verification code generation method, a data verification method and an electronic device capable of dynamically generating verification codes of a part of data or capable of quickly verifying the integrity of a part of data. To achieve the object, a verification code generation method performed in an electronic device is provided according to an embodiment of the present invention, wherein the electronic device is for performing encoding to generate a video/audio stream having multiple data segments. The verification code generation method includes the following steps. Each time one of the data segments is generated from the encoding, a first-level checksum associated with the data segment is generated, and the first-level checksum is recorded in an accompanying verification file. At an interval of every N data segments of the data segments, a second-level checksum is generated for W consecutive first-level checksums, and the second-level checksum is recorded in the accompanying verification file. Wherein, W is a positive integer greater than or equal to 2, N is a positive integer greater than 0 and smaller than or equal to W.

A data verification method performed in an electronic device is further provided according to an embodiment of the present invention, wherein the electronic device has the accompanying verification file of the foregoing embodiment stored therein. The data verification method includes the following steps. First, according to a starting time of a video/audio under verification, a first-level checksum corresponding to the video/audio under verification is identified from multiple first-level checksums in the accompanying verification file, wherein the first-level checksum includes a first hash value associated with a data segment of the data segments and associated with a timestamp associated with the data segment. Then, according to the first hash value of the first-level checksum corresponding to the video/audio under verification, it is verified whether the video/audio under verification is correct, wherein a second-level checksum covering the first-level checksum corresponding to the video/audio under verification includes a second hash value of multiple first hash values of covered multiple first-level checksums, and multiple timestamps of the covered first-level checksums.

An electronic device is further provided according to an embodiment of the present invention. The electronic device includes an encoding engine, a verification code generation circuit and at least one storage device. The encoding engine is for performing encoding to generate a video/audio stream including multiple data segments. The storage device stores a first application which is for instructing the electronic device to perform the verification code generation method of the foregoing embodiment. Preferably, the electronic device may further include a verification circuit, and the storage device stores a second application which is for instructing the electronic device to perform the data verification method of the foregoing embodiment.

To further understand the features and technical contents of the present invention, please refer to the detailed description and accompanying drawings associated with the present invention. However, the description and the accompanying drawings are for illustrating the present invention and are not to be construed as limitations to the claim scope of the present invention.

DETAILED DESCRIPTION OF THE EMBODIMENTS

Figure 1:
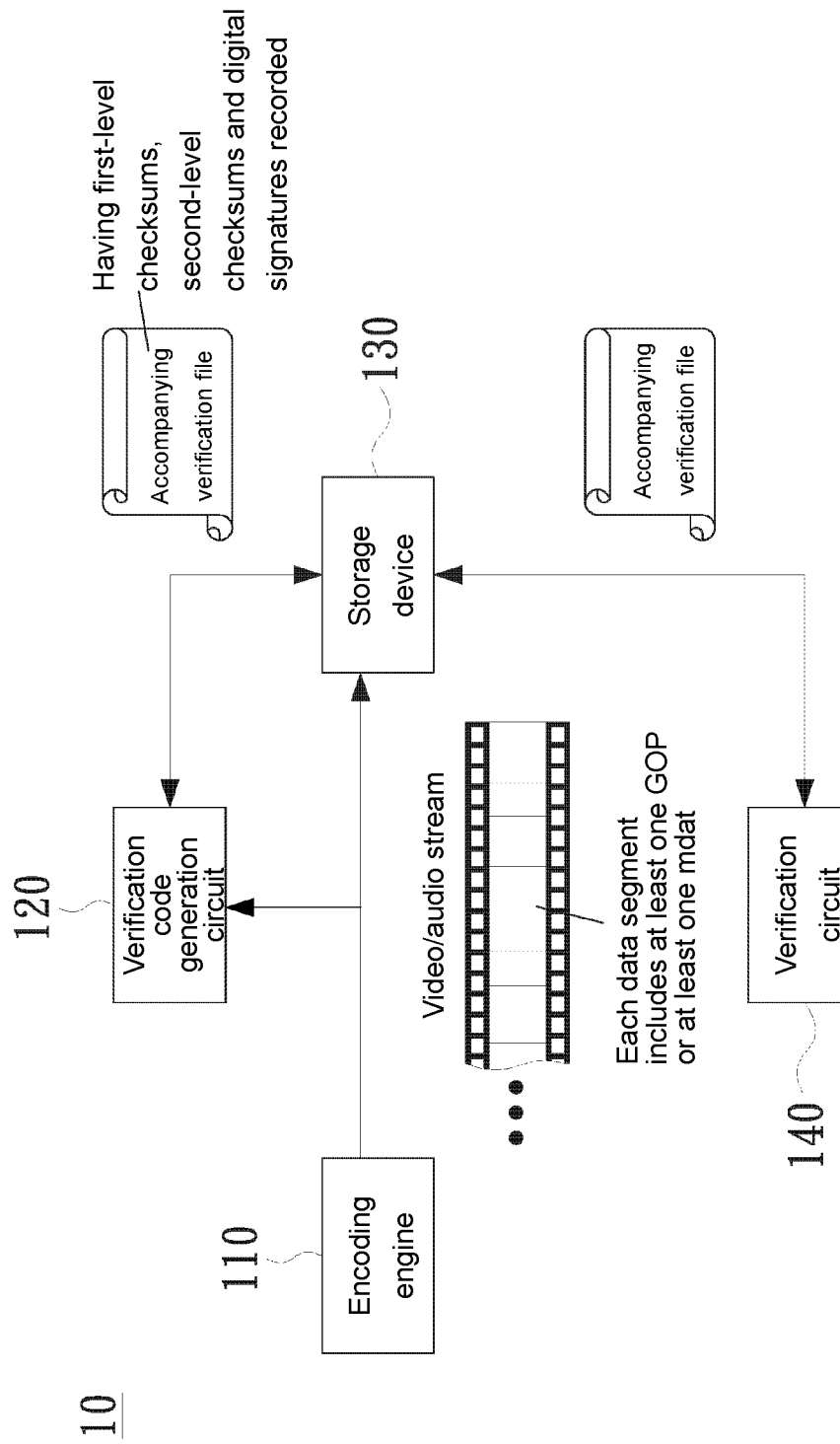
FIG. 1 is a function block diagram of an electronic device provided according to an embodiment of the present invention.

In the disclosure below, various embodiments of the present invention are given in detail with the accompanying drawings to describe the present invention. However, the concepts of the present invention can be embodied by means of numerous different forms and are not to be construed as being limited to the exemplary embodiments given in the disclosure. Furthermore, the same reference numerals in the drawings can represent similar elements.

Figure 2:
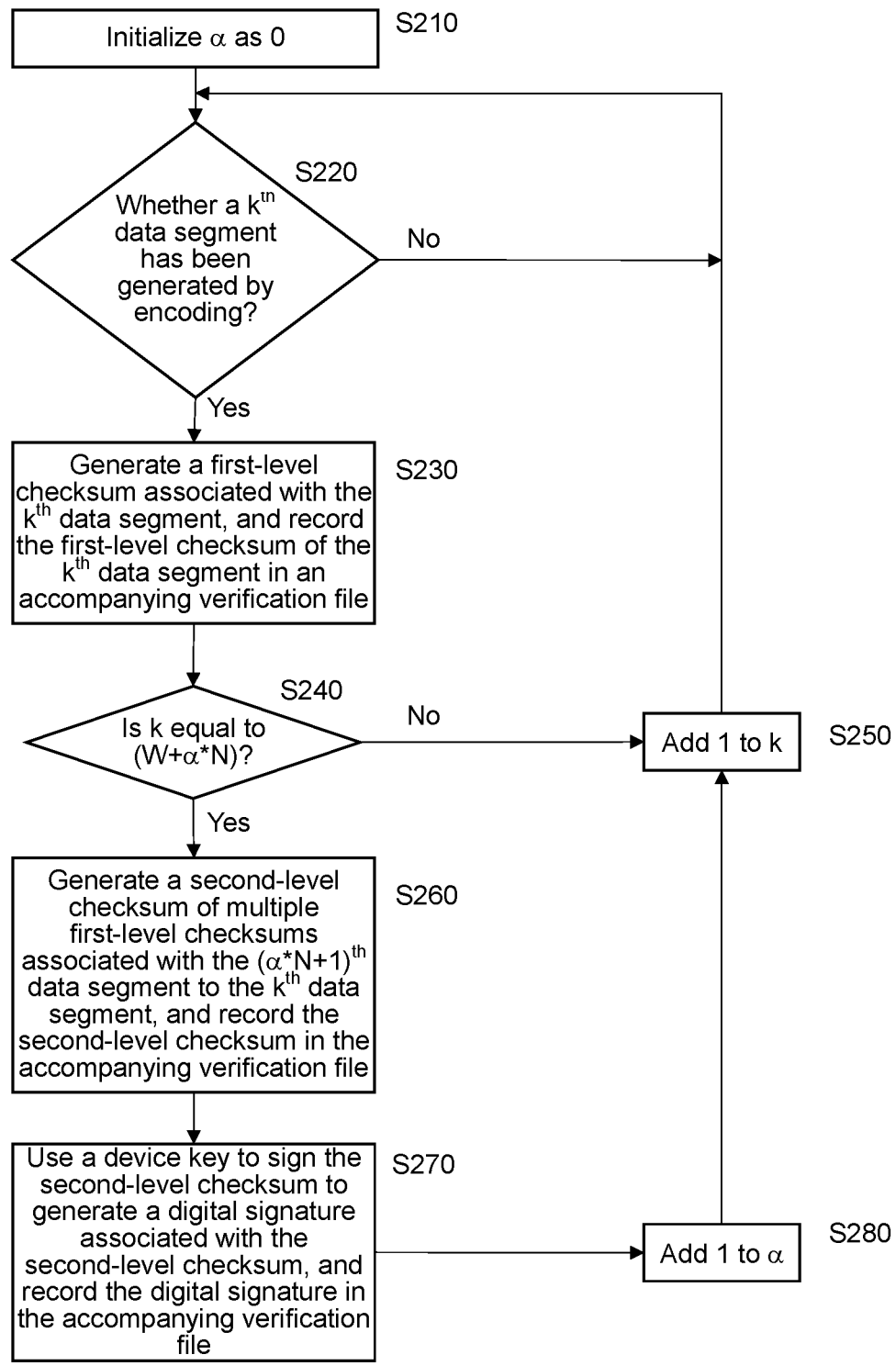
FIG. 2 is a flowchart of a verification code generation method according to an embodiment of the present invention.

Refer to both FIG. 1 and FIG. 2. FIG. 1 shows a function block diagram of an electronic device provided according to an embodiment of the present invention. FIG. 2 shows a flowchart of a verification code generation method provided according to an embodiment of the present invention. It should be noted that, the verification code generation method in FIG. 2 can be performed in the electronic device 10 in FIG. 1; however, the present invention does not limit that the verification code generation method in FIG. 2 can be performed only in the electronic device 10 in FIG. 1. In FIG. 1, the electronic device 10 includes an encoding engine 110, a verification code generation circuit 120 and at least one storage device. For illustration purposes, in this embodiment, the storage device in a quantity of one, i.e., the storage device 130, is given as an example, and such exemplary quantity is not to be construed as a limitation to the present invention. Furthermore, the encoding engine 110, the verification code generation circuit 120 and the storage device 130 can be implemented by purely hardware circuits, or be implemented by hardware circuits matched with firmware or software. In brief, the present invention does not limit the specific implementation form of the electronic device 10, and a person skilled in the art could carry out associated designs according to actual requirements or applications. Furthermore, the verification code generation circuit 120 is coupled between the encoding engine 110 and the storage device 130, and the encoding engine 110, the verification code generation circuit 120 and the storage device 130 can be integrated together or be separately configured; however, the present invention is not limited to the above.

The encoding engine 110 is for performing encoding to generate a video/audio stream having multiple data segments. In this embodiment, the video/audio stream is generated by encoding according to, for example, the MPEG-4 standard. Thus, each data segment of the video/audio stream can include at least one group of pictures (GOP) or at least one set of media data (mdat); however, the present invention is not limited to the above. In practice, the present invention does not limit that the data segments need to individually include the same quantity of GOPs or media data, and the quantity of GOP or media data included in each data segment can be dynamically determined according to the operation capability of the electronic device 10. For example, in this embodiment, the electronic device 10 can be, for example, a body cam, and thus each data segment can include 5 to 8 GOPs; however, the present invention is not limited to the above. The operation principle of generating a video/audio stream by encoding according to the MPEG-4 standard is generally known to a person skilled in the art, and thus details of the encoding engine 110 are not further described herein.

The storage device 130 is for storing the data segments of the video/audio stream. The verification code generation method in FIG. 2 can be achieved by an application (not shown) having a plurality of instructions. In this embodiment, the application is referred to as a first application which can also be stored in the storage device 130 and is for instructing the electronic device 10 to perform the verification code generation method in FIG. 2. That it to say, when the electronic device 10 is installed with the first application, the electronic device 10 can activate the verification code generation method in FIG. 2. It should be noted that, the present invention does not limit the specific implementation form of the electronic device 10 regarding the installation of the first application and the activation for performing the verification code generation method in FIG. 2, and a person skilled in the art could carry out associated designs according to actual requirements or applications.

More specifically, after the electronic device 10 activates the verification code generation method in FIG. 2, as shown in FIG. 2, the verification code generation circuit 120 first initializes a variable $\alpha$ as 0 in step S210, and determines whether the encoding engine 110 has generated a $k^{th}$ data segment (of the video/audio stream) by encoding in step S220. If so, the process continues to step S230, otherwise the process returns to step S220 until the $k^{th}$ data segment has been generated by encoding. In step S230, the verification code generation circuit 120 generates a first-level checksum associated with the $k^{th}$ data segment, and records the first-level checksum of the $k^{th}$ data segment in an accompanying verification file. It should be understood that, the above variable k is a positive integer starting from 1, and the first-level checksum of the $k^{th}$ data segment includes a hash value associated with the $k^{th}$ data segment, wherein the hash value is referred to as a first hash value in this embodiment. The operation principle for generating the hash value of the $k^{th}$ data segment is generally known to a person skilled in the art, and thus associated details are not further described herein.

The present invention does not limit the specific implementation form of the accompanying verification file, and a person skilled in the art could carry out associated designs according to actual requirements and applications. In this embodiment, the accompanying verification file can be similarly stored in the storage device 130. Alternatively, in other embodiments, if the electronic device 10 further includes a second storage device, the second storage device can be in charge for storing the accompanying verification file, or alternatively speaking, for storing a verification code of this embodiment. In step S240, the verification code generation circuit 120 determines whether the variable k is equal to (W+$\alpha$*N). In this embodiment, W represents W consecutive data segments (or the number of the first-level checksums) needed for generating one second-level checksum, N represents a data segment interval at which one second-level checksum is generated, where W is a positive integer greater than or equal to 2, and N is a positive integer greater than 0 and smaller than or equal to W, that is, 0<N≤W. If not, the process continues to step S250; and if so, the process continues to step S260. In step S250, the verification code generation circuit 120 adds 1 to k, and the process returns to step S220 after 1 is added to k.

Figure 3A:
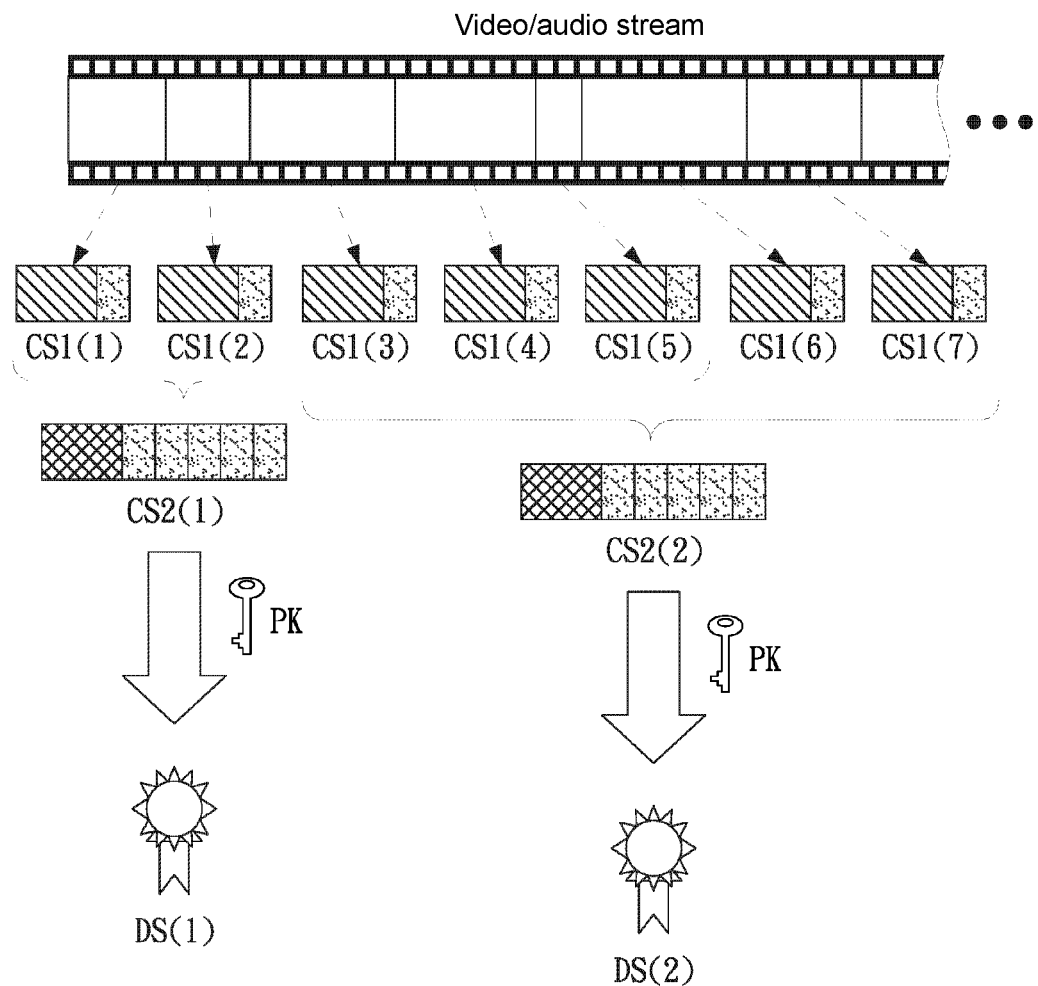
FIG. 3A is a schematic diagram of checksums and digital signatures generated in the verification code generation method in FIG. 2 according to an embodiment.

In step S260, the verification code generation circuit 120 generates a second-level checksum of multiple first-level checksums associated with the $(\alpha*N+1)^{th}$ data segment to the $k^{th}$ data segment, and records the second-level checksum in the accompanying verification file. In step S270, the verification code generation circuit 120 uses a device key PK (not shown in FIG. 1) to sign the second-level checksum to generate a digital signature associated with the second-level checksum, and records the digital signature in the accompanying verification file. In step S280, the verification code generation circuit 120 adds 1 to $\alpha$, and the process continues to step S250 after 1 is added to $\alpha$. For illustration purposes below, it is assumed that W is 5 and N is 2 for example; however, the present invention is not limited to the above. Refer to FIG. 3A showing a schematic diagram of checksums and digital signatures generated in the verification code generation method in FIG. 2 according to an embodiment of the present invention.

As shown in FIG. 3A, after it is determined that the encoding engine 110 has generated the $1^{st}$ data segment by encoding, the verification code generation circuit 120 generates a first-level checksum CS1(1) associated with the $1^{st}$ data segment, and records the first-level checksum CS1(1) in the accompanying verification file (not shown in FIG. 3A). However, at this point in time, the variable k is not equal to (W+α*N), that is, 1≠(5+0*2). Thus, the verification code generation circuit 120 adds 1 to k, that is, performing step S250 in FIG. 2 to render k to become 2; after k has become 2, the verification code generation circuit 120 determines whether the encoding engine 110 has generated the $2^{nd}$ data segment by encoding. If so, the verification code generation circuit 120 generates a first-level checksum CS1(2) associated with the $2^{nd}$ data segment, and records the first-level checksum CS1(2) in the accompanying verification file. The above steps are repeated until the verification code generation circuit 120 generates a first-level checksum CS1(5) associated with the $5^{th}$ data segment, and records the first-level checksum CS1(5) in the accompanying verification file. At this point in time, the variable k is equal to (W+α*N), that is, 5=(5+0*2). Thus, the verification code generation circuit 120 generates a second-level checksum CS2(1) associated with the (α*N+1)$^{th}$ data segment to the $k^{th}$ data segment, i.e., a second-level checksum CS2(1) of the first-level checksums CS1(1) to CS1(5) of the $1^{st}$ to the $5^{th}$ data segments, and records the second-level checksum CS2(1) in the accompanying verification file. Next, the verification code generation circuit 120 uses the device key PK to sign the second-level checksum CS2(1) to generate a digital signature DS(1) associated with the second-level checksum CS2(1), and records the digital signature DS(1) in the accompanying verification file.

It should be noted that, the second-level checksum CS2(1) can include a new hash value of the first hash values of the covered first-level checksums CS1(1) to CS1(5), wherein the new hash value is simply referred to as a second hash value. That is to say, in this embodiment, the verification code generation circuit 120 performs hash processing by using the first hash values of the first-level checksums CS1(1) to CS1(5) to generate the second hash value in the second-level checksum CS2(1). For illustration purposes below, the first hash value in each first-level checksum is represented by a diagonal line shaded block, and the second hash value of each second-level checksum is represented by a grid shaded block. As previously described, because hash values generated by hash processing for different data are different, a person skilled in the art could understand that, the diagonal line shaded blocks and the grid shaded blocks in the following embodiments in fact represent different hash values. Furthermore, in this embodiment, the device key PK can also be similarly stored in the storage device 130; alternatively, in other embodiments, if the electronic device 10 further includes a third storage device, the third storage device can be in charge of storing the device key PK, and the present invention does not limit the specific implementation form of the device key PK. The operation principle of using the device key PK to sign and generate a digital signature is generally known to a person skilled in the art, and thus associated details are not further described herein.

To further implement the data verification method provided according to the embodiment of the present invention, the first-level checksum CS1(k) of the $k^{th}$ data segment can further include a timestamp associated with the $k^{th}$ data segment, and the second-level checksum CS2(α+1) can further include the timestamps of the covered first-level checksums CS1(α*N+1) to CS1(k). For example, the first-level checksum CS1(1) of the $1^{st}$ data segment further includes the timestamp associated with the $1^{st}$ data segment, and similarly, the first-level checksum CS1(5) of the $5^{th}$ data segment further includes the timestamp associated with the $5^{th}$ data segment; moreover, the second-level checksum CS2(1) further includes the timestamps of the covered first-level checksums CS1(1) to CS1(5). However, the present invention is not limited to the above. The operation principle of the data verification method is to be described in detail by means of other embodiments below, and thus the associated details are not further described herein. It should be noted that, for illustration purposes below, the timestamp of each data segment is represented by a dot shaded block in the embodiments of the disclosure, and since the timestamps of the data segments are necessarily different, the dot shaded blocks in fact represent different timestamps. However, the present invention also does not limit the specific implementation form of the timestamps.

The verification code generation circuit 120 then sequentially adds 1 to α and adds 1 to k, i.e., performing step S280 and step S250 in FIG. 2 to render α and k to become 1 and 6, respectively. After α and k have respectively become 1 and 6, the verification code generation circuit 120 again determines whether the encoding engine 110 has generated the $6^{th}$ data segment by encoding. If so, the verification code generation circuit 120 generates a first-level checksum CS1(6) associated with the $6^{th}$ data segment, and records the first-level checksum CS1(6) in the accompanying verification file. The above steps are repeated similarly until the verification code generation circuit 120 generates a first-level checksum CS1(7) associated with the $7^{th}$ data segment, and records the first-level checksum CS1(7) in the accompanying verification file. At this point in time, as the variable k is equal to (W+α*N), i.e., 7=(5+1*2), the verification code generation circuit 120 generates a second-level checksum CS2(2) associated with the (α*N+1)$^{th}$ data segment to the $k^{th}$ data segment, i.e., a second-level checksum CS2(2) of the first-level checksums CS1(3) to CS1(7) of the $3^{rd}$ to $7^{th}$ data segments, and records the second-level checksum CS2(2) in the accompanying verification file.

Similarly, the verification code generation circuit 120 again uses the device key PK to sign the second-level checksum CS2(2) to generate a digital signature DS(2) associated with the second-level checksum CS2(2), and records the digital signature DS(2) in the accompanying verification file. The subsequent details are as those described previously, and shall be omitted herein. In other words, in the steps in FIG. 2, each time the encoding engine 110 finishes generates one of the data segments by encoding, the verification code generation method of this embodiment generates a first-level checksum associated with the data segment, and records the first-level checksum of the data segment in the accompanying verification file. At an interval of every N data segments of the data segments, the verification code generation method of this embodiment generates a second-level checksum for W consecutive first-level checksums, and records the second-level checksum in the accompanying verification file. In addition, the verification code generation method of this embodiment can further use the device key PK to sign the second-level checksum to generate a digital signature associated with the second-level checksum, and record the digital signature in the accompanying verification file.

On the basis of the teaching provided by the disclosure above, it would be easy for a person skilled in the art to understand that, different from the prior that divides an original video file completely stored in the storage device 130 into multiple frames and then individually performs hash processing on the frames, the verification code generation method of this embodiment is capable of dynamically generating a verification code for a part of data in a situation where the electronic device 10 is currently generating a video/audio stream. More particularly, when it is determined that once the encoding engine 110 has generated a part of data of sufficient units by encoding, the verification code generation method of this embodiment can real-time generate a first-level checksum for that part of data, and record the first-level checksum in the accompanying verification file, without affecting an original structure of the video/audio stream. In addition, without processing a video/audio stream that is already completely stored, the verification code generation method of this embodiment can again generate, at an interval of every N data segments, a second-level checksum for W consecutive first-level checksums and similarly record the second-level checksum in the accompanying verification file. Therefore, the verification code generation method of this embodiment allows a subsequent verification method to quickly verify the integrity of a part of data in the video/audio stream according to the accompanying verification file. More particularly in a situation where a part of data is damaged or lost, the data verification method provided according to an embodiment of the present invention is still capable of verifying the undamaged part of data correctly.

Moreover, different from the prior art that performs signing only in the last step, or alternatively speaking, performing signing in a final accompanying document, the verification code generation method of this embodiment signs every second-level checksum so as to individually generate corresponding digital signatures to reliably achieve a non-repudiation mechanism of a part of data. Furthermore, after it is determined that a video/audio stream is completely generated by encoding, or alternatively speaking, when each data segment in the video/audio stream is completely written to the storage device 130, the verification code generation circuit 120 can read all of the first-level checksums from the accompanying verification file, and set new constants W and N to again form and generate a new second-level checksum and a new digital signature, both of which can be similarly recorded in the accompanying verification file. Thus, by setting new constants W and N, for example, setting W and N in FIG. 3A to 3 and 1, the verification code generation method of this embodiment can allow a subsequent verification method to quickly verify the integrity of more small-part data. After the new second-level checksum and digital signature are recorded in the accompanying verification file, the verification code generation circuit 120 can delete the old second-level checksum and digital signature to save a capacity needed for recording in the accompanying verification file. In brief, the present invention does not limit the specific implementation form of the verification code generation circuit 120 regarding again forming the new second-level checksum and digital signature.

Figure 3B:
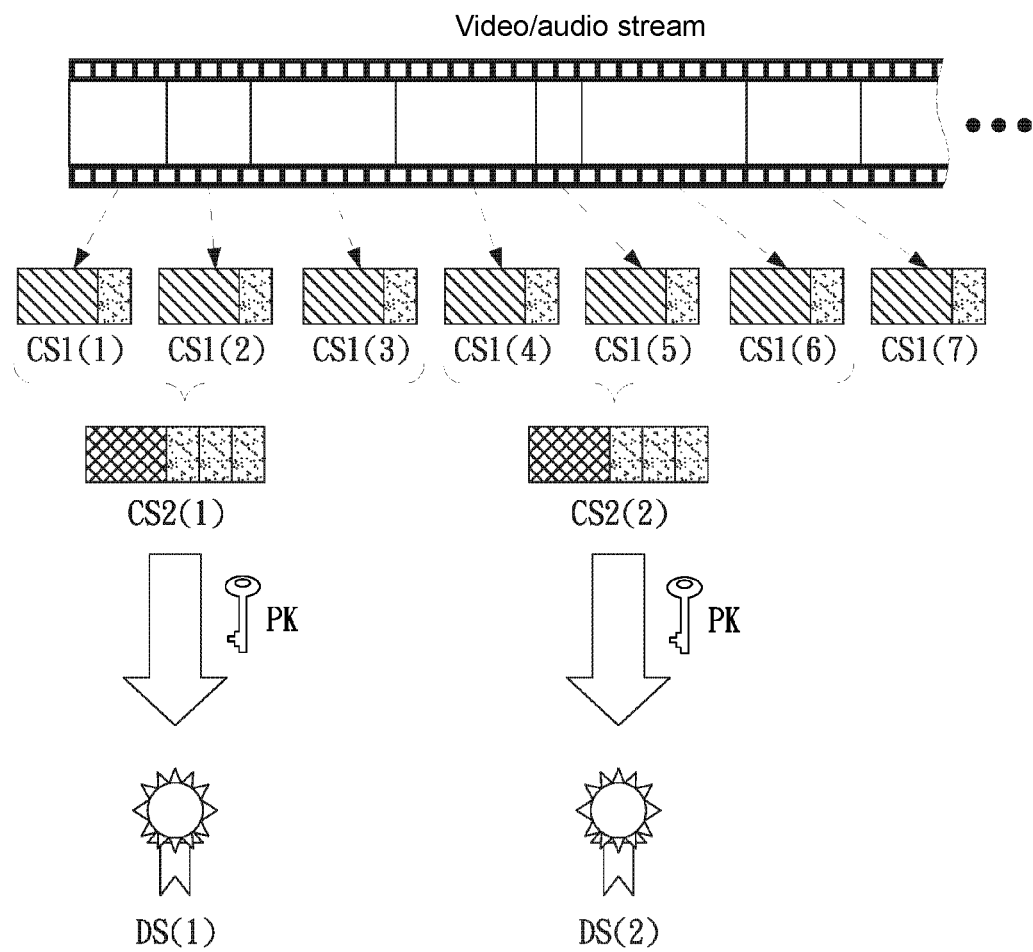
FIG. 3B is a schematic diagram of checksums and digital signatures generated in the verification code generation method in FIG. 2 according to another embodiment.

Furthermore, it is understandable that, when N is smaller than W, overlapping of (W−N) data segments is caused for a part of data corresponding to each second-level checksum; when N is equal to W, no overlapping is caused in the part of data corresponding to each second-level checksum. Thus, refer to FIG. 3B showing a schematic diagram of checksums and digital signatures generated in the verification code generation method in FIG. 2 according to another embodiment. In the embodiment in FIG. 3B, it is assumed that both W and N are 3 for example; however, the present invention is not limited to the above.

As shown in FIG. 3B, when it is determined that the encoding engine 110 has generated the $1^{st}$ data segment by encoding, the verification code generation circuit 120 generates a first-level checksum CS1(1) associated with the $1^{st}$ data segment, and records the first-level checksum CS1(1) in the accompanying verification file (not shown in FIG. 3B). However, as the variable k at this point in time is not equal to (W+α*N), i.e., 1≠(3+0*3), the verification code generation circuit 120 adds 1 to k, i.e., performing step S250 in FIG. 2 to render k to become 2. After k has become 2, the verification code generation circuit 120 again determines whether the encoding engine 110 has generated the $2^{nd}$ data segment by encoding. If so, the verification code generation circuit 120 generates a first-level checksum CS1(2) associated with the $2^{nd}$ data segment, and records the first-level checksum CS1(2) in the accompanying verification file. The above steps are repeatedly until the verification code generation circuit 120 generates a first-level checksum CS1(3) associated with the $3^{rd}$ data segment, and records the first-level checksum CS1(3) in the accompanying verification file. At this point in time, as the variable k is equal to (W+α*N), i.e., 3=(3+0*3), the verification code generation circuit 120 generates a second-level checksum CS2(1) associated with the (α*N+1)$^{th}$ data segment to the k$^{th}$ data segment, i.e., a second-level checksum CS2(1) of the first-level checksums CS1(1) to CS1(3) of the $1^{st}$ to $3^{rd}$ data segment, and records the second-level checksum CS2(1) in the accompanying verification file. Next, the verification code generation circuit 120 uses the device key PK to sign the second-level checksum CS2(1) to generate a digital signature DS(1) associated with the second-level checksum CS2(1), and records the digital signature DS(1) in the accompanying verification file.

The verification code generation circuit 120 then sequentially adds 1 to α and adds 1 to k, i.e., performing step S280 and step S250 in FIG. 2 to render α and k to respectively become 1 and 4. After α and k have respectively become 1 and 4, the verification code generation circuit 120 again determines whether the encoding engine 110 has generated the 4$^{th}$ data segment by encoding. If so, the verification code generation circuit 120 generates a first-level checksum CS1 (4) associated with the 4$^{th}$ data segment, and records the first-level checksum CS1(4) in the accompanying verification file. The above steps are repeated until the verification code generation circuit 120 generates a first-level checksum CS1(6) associated with the 6$^{th}$ data segment and records the first-level checksum CS1(6) in the accompanying verification file. At this point in time, as the variable k is equal to (W+α*N), i.e., 6=(3+1*3), the verification code generation circuit 120 generates a second-level checksum CS2(2) associated with the (α*N+1)$^{th}$ data segment to the k$^{th}$ data segment, i.e., a second-level checksum CS2(2) of the first-level checksums CS1(4) to CS1(6) of the 4$^{th}$ to 6$^{th}$ data segments, and records the second-level checksum CS2(2) in the accompanying verification file.

Similarly, the verification code generation circuit 120 again uses the device key PK to sign the second-level checksum CS2(2) to generate a digital signature DS(2) associated with the second-level checksum CS2(2), and records the digital signature DS(2) in the accompanying verification file. Subsequent details are as those given in the above description, and are thus omitted herein. In brief, because the part of data corresponding to each second-level checksum necessarily includes W consecutive parts of data, the verification code generation method of this embodiment allows a subsequent verification method to determine whether orders of the parts of data have been changed, or to determine whether any part of data is lost.

Figure 4:
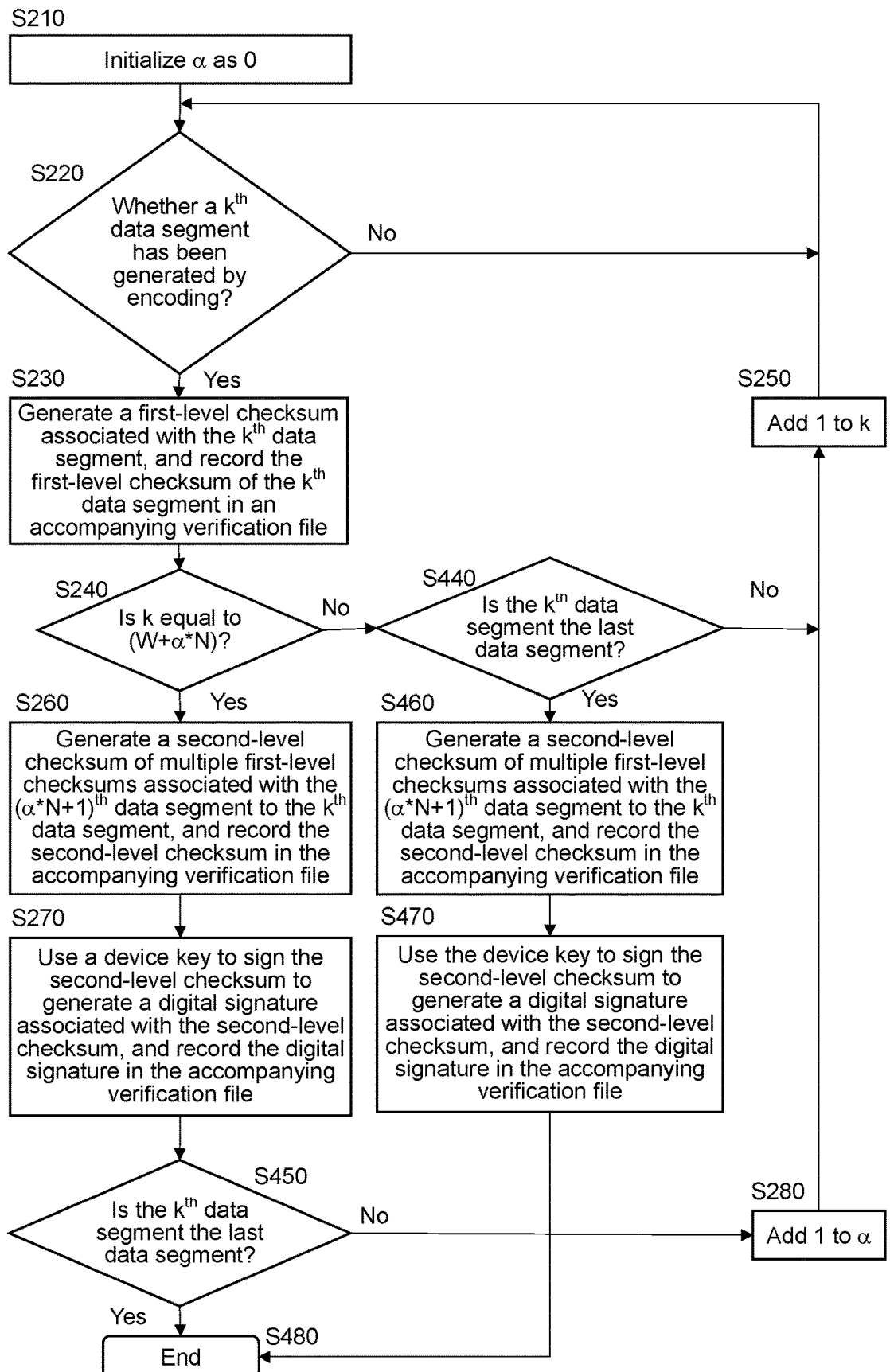
FIG. 4 is a flowchart of a verification code generation method according to another embodiment of the present invention.

On the other hand, considering that if the determination result of step S240 is "negative" when the encoding engine 110 has generated the last data segment of the video/audio stream by encoding, the verification code generation method of the present invention is still required to again generate a second-level checksum for the last several consecutive first-level checksums. Refer to FIG. 4 showing a flowchart of a verification code generation method provided according to another embodiment of the present invention. It should be noted that, the verification code generation method in FIG. 4 can be similarly performed in the electronic device 10 in FIG. 1; however, the present invention does not limit that the verification code generation method in FIG. 4 can be performed only in the electronic device 10 in FIG. 1. Furthermore, some steps in FIG. 4 identical to those in FIG. 2 are represented by the same denotation numerals, and thus associated details are not further described. Compared to step S240 in FIG. 2, after it is determined that the variable k is not equal to (W+α*N), the verification code generation method in FIG. 4 can further include step S440 and steps S460 to S480.

In step S440, the verification code generation circuit 120 again determines whether the $k^{th}$ data segment is the last data segment (of the video/audio stream). If not, the process continues to step S250 to add 1 to the variable k, and returns to step S220 after 1 is added to k; if so, the process continues to steps S460 to S480. In step S460, the verification code generation circuit 120 generates a second-level checksum of multiple first-level checksums associated with the (α*N+1)$^{th}$ data segment to the $k^{th}$ data segment, and records the second-level checksum in the accompanying verification file. In step S470, the verification code generation circuit 120 uses the device key PK (not shown in FIG. 4) to sign the second-level checksum to generate a digital signature associated with the second-level checksum, and records the digital signature in the accompanying verification file. It is understandable that, operation principles of steps S460 and S470 are equivalent to those of steps S260 and S270, except that the $k^{th}$ data segment at this point in time is the last data segment. Thus, in the following step S480, the electronic device 10 ends the verification code generation method of this embodiment. Only when the verification code generation method of this embodiment is again activated, the electronic device 10 again performs the verification code generation method, starting from step S210 in FIG. 4. It should be noted that, the present invention does not limit the specific implementation form of the verification code generation circuit 120 regarding the determination for whether the $k^{th}$ data segment is the last data segment, and a person skilled in the art could carry out associated designs according to actual requirements or applications.

Figure 5A:
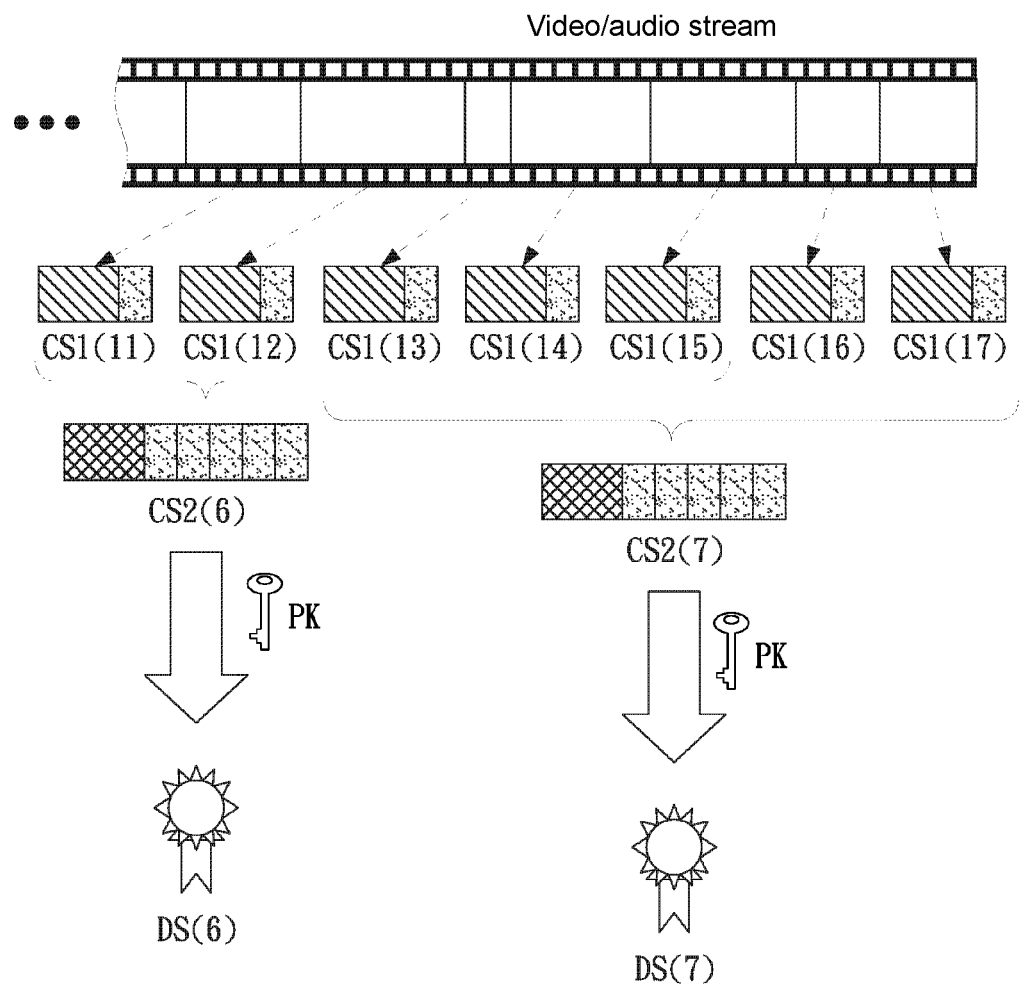
FIG. 5A is a schematic diagram of checksums and digital signatures generated in the verification code generation method in FIG. 4 according to an embodiment.

After it is determined that the variable k is equal to (W+α*N), in addition to continuing to steps S260 and S270, the verification code generation method in FIG. 4 can further include step S450. In step S450, the verification code generation circuit 120 also determines whether the $k^{th}$ data segment is the last data segment (of the video/audio stream). If not, the process continues to step S280 and step S250 to add 1 to α and k, respectively, and returns to step S220 after 1 is added to α and k, respectively. If so, the process continues to step S480, i.e., ending the verification code generation method of this embodiment. For illustration purposes below, it is similarly assumed that W is 5 and N is 2 for example in this embodiment. Refer to FIG. 5A showing a schematic diagram of checksums and digital signatures generated in the verification code generation method in FIG. 4 according to an embodiment. Furthermore, in the embodiment in FIG. 5A, because details before k is 13 are as described above, and thus are omitted herein.

As shown in FIG. 5A, when it is determined that the encoding engine 110 has generated the 14$^{th}$ data segment by encoding, the verification code generation circuit 120 generates a first-level checksum CS1(14) associated with the 14$^{th}$ data segment, and records the first-level checksum CS1(14) in the accompanying verification file (not shown in FIG. 5A). However, as the variable k at this point in time is not equal to (W+α*N), i.e., 14≠(5+5*2), and the 14$^{th}$ data segment should not be the last data segment of the video/audio stream, the verification code generation circuit 120 adds 1 to k, i.e., performing step S250 in FIG. 4 to render k to become 15. After k has become 15, the verification code generation circuit 120 again determines whether the encoding engine 110 has generated the 15$^{th}$ data segment by encoding. If so, the verification code generation circuit 120 generates a first-level checksum CS1(15) associated with the 15$^{th}$ data segment, and records the first-level checksum CS1(15) in the accompanying verification file. As the variable k at this point in time is equal to (W+α*N), i.e., 15=(5+5*2), the verification code generation circuit 120 performs step S260 to generate a second-level checksum CS2(6) associated with the (α*N+1)$^{th}$ data segment to the $k^{th}$ data segment, i.e., a second-level checksum CS2(6) of the first-level checksums CS1(11) to CS1(15) of the 11$^{th}$ to 15$^{th}$ data segments, and records the second-level checksum CS2(6) in the accompanying verification file.

Next, the verification code generation circuit 120 uses the device key PK to sign the second-level checksum CS2(6) to generate a digital signature DS(6) associated with the second-level checksum CS2(6), and records the digital signature DS(6) in the accompanying verification file. However, because the 15$^{th}$ data segment at this point in time is still not the last data segment of the video/audio stream, the verification code generation circuit 120 again sequentially adds 1 to α and adds 1 to k, i.e., performing step S280 and step S250 in FIG. 4 to render α and k to become 6 and 16, respectively. After α and k have respectively become 6 and 16, the verification code generation circuit 120 again determines whether the encoding engine 110 has generated the 16$^{th}$ data segment by encoding. If so, the verification code generation circuit 120 generates a first-level checksum CS1(16) associated with the 16$^{th}$ data segment, and records the first-level checksum CS1(16) in the accompanying verification file. The above steps are repeated until the verification code generation circuit 120 generates a first-level checksum CS1(17) associated with the 17$^{th}$ data segment and records the first-level checksum CS1(17) in the accompanying verification file. At this point in time, as the variable k is equal to (W+α*N), i.e., 17=(5+6*2), the verification code generation circuit 120 performs step S260 to generate a second-level checksum CS2(7) associated with the (α*N+1)$^{th}$ data segment to the $k^{th}$ data segment, i.e., a second-level checksum CS2(7) of the first-level checksums CS1(13) to CS1(17) of the 13$^{th}$ to 17$^{th}$ data segments, and records the second-level checksum CS2(7) in the accompanying verification file.

Similarly, the verification code generation circuit 120 uses the device key PK to sign the second-level checksum CS2(7) to generate a digital signature DS(7) associated with the second-level checksum CS2(7), and records the digital signature DS(7) in the accompanying verification file. It should be noted that, because the 17$^{th}$ data segment at this point in time is the last data segment in the video/audio stream (step S450), the verification code generation circuit 120 continues to step S480 to end the verification code generation method of this embodiment. Furthermore, refer to FIG. 5B showing a schematic diagram of checksums and digital signatures generated in the verification code generation method in FIG. 4 according to another embodiment.

Figure 5B:
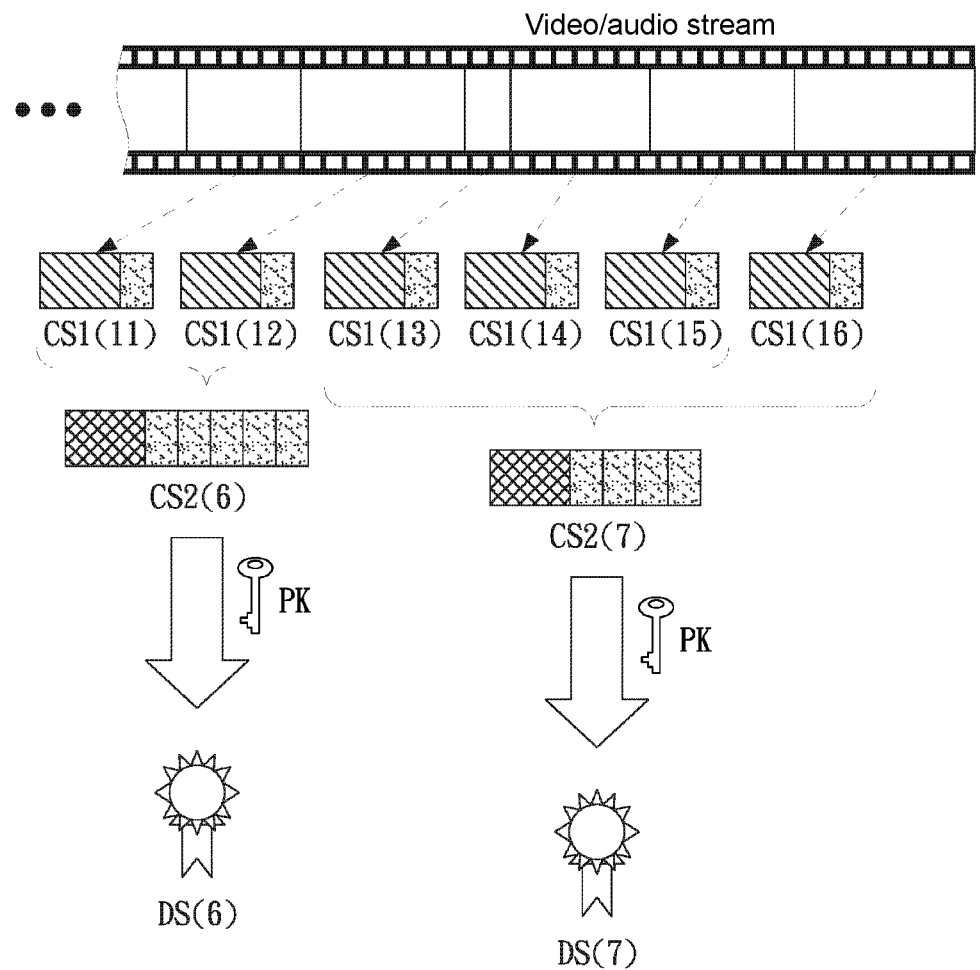
FIG. 5B is a schematic diagram of checksums and digital signatures generated in the verification code generation method in FIG. 4 according to another embodiment.

Compared to FIG. 5A in which the 17$^{th}$ data segment is the last data segment, the 16$^{th}$ data segment is used as the last data segment in FIG. 5B. Thus, even if the variable k at this point in time is not equal to (W+α*N), i.e., 16≠(5+5*2), because the determination result of step S440 is "affirmative", the verification code generation circuit 120 performs step S460 to generate a second-level checksum CS2(7) associated with the (α*N+1)$^{th}$ data segment to the k$^{th}$ data segment, i.e., a second-level checksum CS2(7) of the first-level checksums CS1(13) to CS1(16) of the 13$^{th}$ to 16$^{th}$ data segments, and records the second-level checksum CS2(7) in the accompanying verification file. The above steps are repeated until the digital signature DS(7) of the second-level checksum CS2(7) is recorded in the accompanying verification file (step S470), and the verification code generation circuit 120 then continues to step S480 to end the verification code generation method of this embodiment.

It should be noted that, if the frame rate of the video/audio stream is, for example, 30 FPS, and each data segment of the video/audio stream includes only one 0.5-second GOP, a one-minute video/audio stream can then include 120 data segments, or alternatively speaking, 120 GOPs (i.e., 120 GOP/min). Thus, for the one-minute video/audio stream, the verification code generation circuit 120 can generate 120 first-level checksums, and assuming that W is 8 and N is 6, the verification code generation circuit 120 can further generate 20 second-level checksums and 20 digital signatures. Then, in regard to SHA-2 in a hash function standard, the length of one hash value is defined as 256 bits, which are equivalent to 32 bytes (i.e., 256 bits=32 bytes), and the lengths of one timestamp and one digital signature are respectively 32 bytes and 256 bytes. Thus, the 120 first-level checksums within this one minute include a total of 7,680 bytes, i.e., 120*(32+32)=7,680; the 20 second-level checksums and 20 digital signatures within this one minute respectively include totals of 5,760 bytes and 5,120 bytes, i.e., 20*(32+8*32)=5,760 and 20*256=5,120. That is to say, compared to the one-minute video/audio stream having a data size of approximately 200 MB, the accompanying verification file requires only approximately 18K bytes. Therefore, the verification code generation method of this embodiment does not bring noticeably loading to the overall system.

Figure 6:
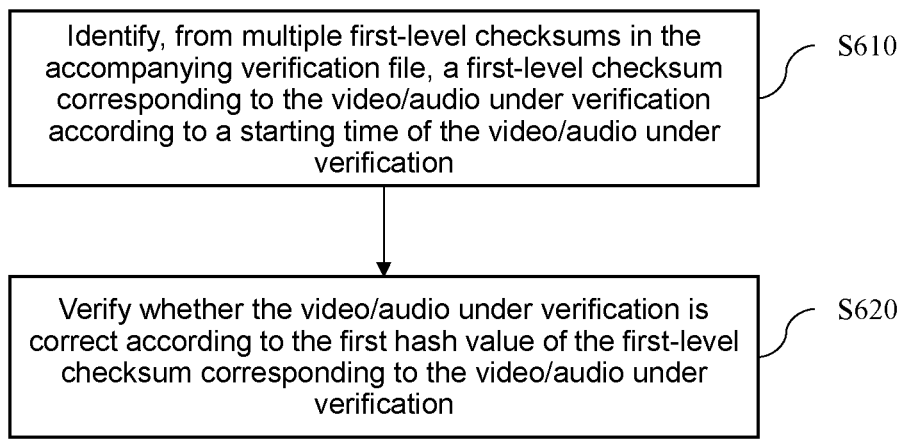
FIG. 6 is a flowchart of a data verification method provided according to an embodiment of the present invention.

To further illustrate a verification process collaborating with the verification code generation method of this embodiment, the present invention further provides an embodiment for a subsequent verification method. Refer to FIG. 6 showing a flowchart of a data verification method provided according to an embodiment of the present invention. It should be noted that, the data verification method in FIG. 6 can similarly be performed in the electronic device 10 in FIG. 1; however, the present invention does not limit that the data verification method in FIG. 6 can be performed only in the electronic device 10 in FIG. 1. Alternatively speaking, the verification code generation method of the foregoing embodiment and the data verification method of this embodiment can be performed by the same electronic device, e.g., the electronic device 10 in FIG. 1, or be respectively performed by different electronic devices. In brief, the electronic device performing the data verification method of this embodiment needs to store the accompanying verification file of the foregoing embodiment.

Similarly, the data verification method in FIG. 6 can be achieved by an application (not shown) having a plurality of instructions, and the application is referred to as a second application in this embodiment. Moreover, for illustration purposes, this embodiment is also performed by the electronic device 10 in FIG. 1. Thus, the electronic device 10 in FIG. 1 can further include a verification circuit 140 coupled to the storage device 130, and the second application can similarly be stored in the storage device 130 and is used for instructing the electronic device 10 to perform the data verification method in FIG. 6. That is to say, when the electronic device 10 is installed with the second application, the electronic device 10 can activate the data verification method in FIG. 6. The present invention does not limit the specific implementation form of the verification circuit 140, nor does it limit the specific implementation forms of the electronic device 10 regarding the installation of the second application and the activation of the data verification method in FIG. 6. A person skilled in the art can carry out associated designs according to actual requirements and applications.

More specifically, after the electronic device 10 activates the data verification method in FIG. 6, as shown in FIG. 6, in step S610, according to a starting time of a video/audio under verification, the verification circuit 140 identifies, from multiple first-level checksums in the accompanying verification file, a first-level checksum corresponding to the video/audio under verification. However, for illustration purposes, it is assumed in this embodiment that the video/audio under verification is one data segment in FIG. 3A; however, the present invention is not limited to the above example. Furthermore, the first-level checksum corresponding to the video/audio under verification can include the first hash value of one data segment in FIG. 3A as well as the timestamp associated with the data segment. Thus, in this embodiment, the verification circuit 140 can determine by comparison whether the starting time of the video/audio under verification matches the timestamp of any one of the data segments in FIG. 3A to identify the first-level checksum corresponding to the video/audio under verification; however, the present invention is not limited to the above.

In step S620, the verification circuit 140 can verify whether the video/audio under verification is correct according to the first hash value of the first-level checksum corresponding to the video/audio under verification. For example, assuming that the first-level checksum corresponding to the video/audio under verification refers to the first-level checksum CS1(3) in FIG. 3A, the verification circuit 140 can use the same hash function to calculate the hash value of the video/audio under verification, and determine by comparison whether the hash value of the video/audio under verification is the same as the first hash value in the first-level checksum CS1(3). If the two are the same, it means that the video/audio under verification is correct; if the two are different, it means that the video/audio under verification has been tampered. The operation principle of using a hash value for data verification is generally known to a person skilled in the art, and thus the associated details are not further described herein.

As shown in FIG. 3A, the second-level checksum CS2(1) covering the first-level checksum CS1(3) corresponding to the video/audio under verification includes a second hash value of multiple first hash values of the covered first-level checksums CS1(1) to CS1(5), and multiple timestamps of the covered first-level checksums CS1(1) to CS1(5). Thus, when the video/audio under verification refers to the 3$^{rd}$ data segment, given that the verification circuit 140 obtains the 1$^{st}$, 2$^{nd}$, 4$^{th}$ and 5$^{th}$ a data segments, the verification circuit 140 can also verify according to the first hash values of the first-level checksums CS1(1) to CS1(5) and the second hash value of the second-level checksum CS2(1), whether the above parts of data have been tampered. Similarly, in this embodiment, the verification circuit 140 can further identify from the accompanying verification file the second-level checksum CS2(1) covering the first-level checksum CS1(3) corresponding to the video/audio under verification, and use the same device key PK to verify whether the second-level checksum CS2(1) and the digital signature DS(1) associated with the second-level checksum CS2(1) are correct. In brief, with thorough understanding of the verification code generation method of the foregoing embodiment, a person skilled in the art could carry out associated designs of the subsequent verification method according to actual requirements or applications.

In conclusion, different from the prior art that divides an original video file completely stored into multiple frames and then individually performs hash processing on the frames, the verification code generation method of the embodiment of the present invention is capable of dynamically generating a verification code for a part of data in a situation where the electronic device is currently generating a video/audio stream. More particularly, when it is determined that once the encoding engine has generated a part of data of sufficient units by encoding, the verification code generation method of the embodiment of the present invention can real-time generate a first-level checksum associated with that part of data, and record the first-level checksum in the accompanying verification file. In addition, without processing a video/audio stream that is already completely stored, the verification code generation method of the embodiment of the present invention can again generate, at an interval of every N data segments, a second-level checksum for W consecutive first-level checksums and similarly record the second-level checksum in the accompanying verification file. Therefore, the verification code generation method of the embodiment of the present invention allows a subsequent verification method, e.g., the data verification method provided by the embodiment of the present invention, to quickly verify the integrity of a part of data according to the accompanying verification file. More particularly in a situation where a part of data is damaged or lost, the data verification method provided according to the embodiment of the present invention is still capable of verifying the undamaged part of data correctly.

While the present invention has been described by way of the above embodiments, it is to be understood that the claim scope of the present invention is not limited thereto.

What is claimed is:

1. An encoding and verification code generation method, performed in an electronic device, comprising:
    performing encoding by an encoding engine to generate a video/audio stream having a plurality of data segments;
    each time a data segment of the data segments is completely generated by encoding, dynamically generating a first-level checksum associated with the data segment in real-time by a verification code generation circuit, and recording the first-level checksum in an accompanying verification file; and
    at an interval of every N data segments of the data segments, generating a second-level checksum for W consecutive first-level checksums by the verification code generation circuit, and recording the second-level checksum in the accompanying verification file, where W is a positive integer greater than or equal to 2, and N is a positive integer greater than 0 and smaller than or equal to W;
    wherein the first-level checksum of the data segment comprises a first hash value associated with the data segment, and the second-level checksum comprises a second hash value of the first hash values of the covered first-level checksums,
    wherein the first-level checksum of the data segment further comprises a timestamp associated with the data segment, and the second-level checksum further comprises the timestamps of the covered first-level checksums, and
    wherein the timestamp associated with the data segment is a starting time of the data segment.

2. The encoding and verification code generation method according to claim 1, wherein the step of generating the second-level checksum and recording the second-level checksum in the accompanying verification file further comprises:
    using a device key to sign the second-level checksum to generate a digital signature associated with the second-level checksum, and recording the digital signature in the accompanying verification file.

3. The encoding and verification code generation method according to claim 2, wherein the data segment comprises at least one group of pictures (GOP) or at least one set of media data (mdat).

4. An encoding and data verification method, performed in an electronic device, the encoding and data verification method comprising:
    performing encoding by an encoding engine dynamically in real-time to generate a video/audio stream having a plurality of data segments;
    recording, by an accompanying verification file stored in the electronic device, a plurality of first-level checksums associated with the plurality of data segments of a video/audio stream;
    recording, by the accompanying verification file, at an interval of every N data segments of the data segments, a second-level checksum associated with W consecutive first-level checksums, W being a positive integer greater than or equal to 2, N being a positive integer greater than 0 and smaller than or equal to W;
    identifying, from the first-level checksums in the accompanying verification file, a first-level checksum corresponding to a video/audio under verification according to a starting time of the video/audio under verification, the first-level checksum comprising a first hash value associated with one data segment of the data segments and a timestamp associated with the data segment, wherein the timestamp associated with the data segment is a starting time of the data segment; and
    verifying, according to the first hash value of the first-level checksum corresponding to the video/audio under verification, whether the video/audio under verification is correct, wherein the second-level checksum covering the first-level checksum corresponding to the video/audio under verification comprises a second hash value of the first hash values of the covered first-level checksums and the timestamps of the covered first-level checksums.

5. The encoding and data verification method according to claim 4, wherein, with respect to the second-level checksum covering the first-level checksum corresponding to the video/audio under verification, the accompanying verification file further records a digital signature associated with the second-level checksum, the data verification method further comprising:

identifying, from the accompanying verification file, the second-level checksum covering the first-level checksum corresponding to the video/audio under verification; and using a device key to verify whether the second-level checksum and the digital signature associated with the second-level checksum are correct.

6. An electronic device, comprising:

an encoding engine, for performing encoding to generate a video/audio stream having a plurality of data segments;

a verification code generation circuit; and at least one storage device, storing a first application, the first application for instructing the electronic device to perform a verification code generation method, wherein the verification code generation method comprises:

each time a data segment of the data segments is completely generated by encoding performed by the encoding engine, the verification code generation circuit dynamically generating a first-level checksum associated with the data segment in real-time, and recording the first-level checksum in an accompanying verification file; and at an interval of every N data segments of the data segments, the verification code generation circuit generating a second-level checksum for W consecutive first-level checksums, and recording the second-level checksum in the accompanying verification file, where W is a positive integer greater than or equal to 2, and N is a positive integer greater than 0 and smaller than or equal to W;

wherein the first-level checksum of the data segment comprises a first hash value associated with the data segment, and the second-level checksum comprises a second hash value of the first hash values of the covered first-level checksums, wherein the first-level checksum of the data segment further comprises a timestamp associated with the data segment, and the second-level checksum further comprises the timestamps of the covered first-level checksums, and wherein the timestamp associated with the data segment is a starting time of the data segment.

7. The electronic device according to claim 6, wherein the step of generating the second-level checksum and recording the second-level checksum in the accompanying verification file further comprises:

using, by the verification code generation circuit, a device key to sign the second-level checksum to generate a digital signature associated with the second-level checksum, and recording the digital signature in the accompanying verification file.

8. The electronic device according to claim 7, wherein the data segment comprises at least one group of pictures (GOP) or at least one set of media data (mdat).

9. The electronic device according to claim 8, further comprising a verification circuit, the at least one storage device further storing a second application, the second application being for instructing the electronic device to perform a data verification method, wherein the data verification method comprises:

the verification circuit identifying, from the first-level checksums in the accompanying verification file, a first-level checksum corresponding to a video/audio under verification according to a starting time of the video/audio under verification; and verifying, according to the first hash value of the first-level checksum corresponding to the video/audio under verification whether the video/audio under verification is correct.

10. The electronic device according to claim 9, wherein the data verification method further comprises:

identifying, from the accompanying verification file, the second-level checksum covering the first-level checksum corresponding to the video/audio under verification; and using a device key to verify whether the second-level checksum and the digital signature associated with the second-level checksum are correct.

* * * * *